Patented July 18, 1939

2,166,507

UNITED STATES PATENT OFFICE 2,166,507

HIGH-MOLECULAR SULPHUR-CONTAINING PLASTICS

Rudolf Schröter, Leverkusen-I. G. Werk, and Wilhelm Becker, Cologne-Mulheim, Germany, assignors to I. G. Farbenindustrie Aktiengesellschaft, Frankfort-on-the-Main, Germany No Drawing. Application November 29, 1935, Serial No. 52,276. In Germany December 13, 1934

13 Claims. (Cl. 260—79)

The present invention relates to new high-molecular sulphur-containing plastics.

In accordance with our present invention new high-molecular sulphur-containing plastics are obtained by causing water soluble sulphides to react upon diethers selected from the group consisting of acetals, mercaptals and mercaptols, which contain at least two replaceable radicals. Examples for suitable negative radicals are halogen atoms, such as chlorine, though other negative radicals, such as sulphuric acid ester groups, are not excluded from the scope of our invention. Obviously, the nature of the negative radicals has no great effect upon the constitution of the final products, since the negative radicals are eliminated in the course of the reaction and the free bonds formed thereby combine with the sulphur of the water soluble sulphides.

As acetals of the character described there may be mentioned di-($\beta$-chloroethyl)-formaldehyde or acetone acetal, di-($\beta$-chloroethyl)-butyraldehyde acetal, di-(chlorobutyl)- formaldehyde acetal, acetalization products of the condensation product of glycol and $\beta$-chloroethyl-chloromethyl ether. Examples for suitable mercaptals or mercaptols respectively are the products obtainable from formaldehyde or acetone and halogen-containing mercaptanes, for instance, $\beta$-chloro-ethyl-mercaptanes.

As sulphides of the character described there may be used alkali metal, ammonium or alkaline earth metal sulphides, polysulphides being preferably employed.

The mercaptals, acetals and mercaptols as well as the sulphides of the character described can also be employed in admixture with each other or with other compounds containing two or more replaceable negative radicals, such as ethylene chloride, dihalogenated ethers, such as $\beta.\beta'$-dichloro-diethylether or polyhalogenated alcohols, such as glycerine dichlorhydrin.

The reaction can be performed in the presence of water or organic solvents, such as alcohol. In order to obtain an even course of the reaction and to facilitate the purification and isolation from the starting materials, the reaction is preferably performed in the presence of such compounds as are capable of keeping the condensation product formed in suspension. As examples of compounds of this type there may be mentioned freshly precipitated magnesium hydroxide or barium sulphate. A further possibility of obtaining the condensation products in a dispersed form is by the application of emulsifying agents.

The products obtained according to the present process, depending on the selection of the starting materials, the temperature applied and on the other reaction conditions, possess an oily, viscous or a plastic rubber-like character. They are distinguished by their being nearly odorless. By a suitable after-treatment, for example by heating with or without pressure alone or in admixture with natural or artificial rubbers, if desired with the additions usually applied in the rubber industry, the products may be converted into rubber-like masses; they may be shaped before or simultaneously with the after-treatment. For example, on subjecting the sulphur-containing condensation product from di-($\beta'$-chloroethyl)-formaldehyde acetal to a heating under pressure, a product is obtained which is distinguished by a higher elasticity compared with sulphur-containing condensation products from other halogen compounds. It is surprising that the condensation products in contradistinction to the acetals used as starting materials are no longer sensitive to acids.

The following examples illustrate the invention, without, however, restricting it thereto:

Example 1

360 grams of crystallized sodium sulphide are melted together with 96 grams of sulphur at a temperature of 95° C. and heated to boiling after the addition of 180 grams of water. 129 grams of di-($\beta$-chloroethyl)-formaldehyde acetal are then added drop by drop while stirring. The reaction mixture is thereupon heated to boiling for 15 hours and the condensation product separated is washed with water.

Unchanged acetal and the volatile reaction products are removed by means of steam. An elastic, plastic, brownish colored condensation product is thus obtained.

Example 2

A melt of 1200 grams of crystallized sodium sulphide and 600 grams of sulphur is diluted with 600 grams of water and 90 grams of a 33% caustic soda solution are added. A solution of 70 grams of crystallized magnesium chloride in 100 grams of water is then poured in while stirring. The solution is then heated to boiling and 430 grams of di-($\beta$-chloroethyl)-formaldehyde acetal are poured in, the boiling temperature being maintained for 10 hours whereupon the condensation product, which is obtained in a finely dispersed suspension is filtered off and washed with water until it is free from polysulphide. Thereupon the product is treated with steam in a weakly acetic acid solution and after washing to a neutral reaction the condensation product is pre-dried at 90° C. and coagulated by applying it on rollers. 450 grams of an elastic, rubber-like condensation product are thus obtained.

Example 3

To a melt prepared according to the method described in Example 2 there are added while stirring 100 grams of sodium sulphate and a solution of 150 grams of barium chloride in 250 ccs. of water. The mixture is heated to boiling whereupon 690 grams of di-($\beta$-chloroethyl)-formaldehyde acetal are run in, the boiling temperature being maintained for 10 hours. The condensation product, obtained in the form of a suspension, settles at the bottom and can be easily freed from excess of sodium sulphide solution by decanting. After a short steam distillation the product is coagulated and dried by applying it on rollers which are heated to 130° C. 1040 grams of a light-colored rubber-like mass are thus obtained.

Example 4

800 grams of crystallized sodium sulphide are melted with 400 grams of sulphur, then diluted with water and heated to boiling. After the addition of 720 grams of di-($\beta$-chloroethyl)-butyraldehyde acetal and heating to boiling for 10 hours, a light-colored plastic mass is obtained.

Example 5

To a melt of 1200 grams of sodium sulphide ($Na_2S.9H_2O$), 600 grams of sulphur and 600 grams of water there are added at boiling temperature 760 grams of dichlorobutylformaldehyde acetal (obtainable from the mono chlorination product of 1.3-butylene glycol by acetalization with formaldehyde and hydrochloric acid). A soft, adhesive wax-like mass is thus obtained.

Example 6

To the melt obtainable according to Example 4 there are added at 60° C. 800 grams of a formaldehyde acetal, which is obtained from the condensation product of 1 mol of glycol chlorohydrine and 1 mol of ethylene oxide (condensed at 140° C.). The mixture is heated to boiling for 15 hours and after a steam distillation a soft, plastic mass is obtained.

Example 7

300 grams of the condensation product of glycol and $\beta$-chloroethyl-chloromethyl ether (Cl.-$C_2H_4O.CH_2O.C_2H_4O.CH_2O.C_2H_4Cl$) are added to a melt heated to 60° C. consisting of 600 grams of sodium sulphide, 300 grams of sulphur and 300 grams of water. The solution is heated to boiling for 15 hours and subsequently treated with steam. A soft, ropy condensation product is thus obtained.

Example 8

435 grams of calcium sulphide, 720 grams of sulphur and 2000 grams of water are heated to boiling for 6 hours. Into the calcium tetrasulphide solution thus obtained there are poured at boiling temperature 500 grams of di($\beta$-chloroethyl) formaldehyde acetal, the boiling temperature being maintained for another 6 hours to finish the reaction. A somewhat dark colored condensation product is thus obtained possessing similar properties to the product obtainable according to Example 2.

Example 9

85 parts of the condensation product obtainable according to Example 2 are mixed with 15 parts of smoked sheets, 20 parts of zinc oxide and 25 parts of inactive lamp black, 0.2 part of mercaptobenzothiazole and 1 part of stearic acid. The mixture is then pressed for 60 minutes at 142° C. An elastic, soft rubber-like vulcanizate is thus obtained.

Example 10

240 parts of crystallized sodium sulphide are melted with 32 parts of sulphur. The polysulphide thus obtained after being diluted with water is brought to reaction with 86 parts of di-($\beta$-chloroethyl)-formaldehyde acetal. A ropy extremely plastic condensation product is thus obtained.

Example 11

139 parts of crystallized sodium sulphide are melted with 56 parts of sulphur. The polysulphide thus obtained is diluted with 70 parts of water. After the addition of a solution of 7.7 parts of sodium sulphate in 18 parts of water, a solution of 12.5 parts of barium chloride in 29 parts of water is run in.

Thereupon 50 parts of di-($\beta$-chloroethyl)-formaldehyde acetal are added in the course of 6–7 hours at a temperature of 55°. This temperature is maintained for 35 hours while stirring. Then the mixture is diluted with warm water and after settling the liquor is decanted.

After thoroughly washing and drying on rollers being heated to 135°, 75–80 parts of an elastic, rubber-like, odorless condensation product are obtained.

Example 12

To a polysulphide solution of 20 parts of crystallized sodium sulphide and 10 parts of sulphur in 24 parts of water there are added 2 parts of sodium sulphate in 5 parts of water and 3 parts of barium chloride in 6 parts of water.

Thereupon 10 parts of di-($\beta$-chloroethyl)-formaldehyde mercaptal are added drop by drop in the course of 2–3 hours at 70° C., which temperature is maintained for 24 hours. After washing it is distilled for 4 hours by means of steam. 11 parts of a yellow condensation product are thus obtained.

Example 13

385 parts of sodium sulphide are melted with 155 parts of sulphur and diluted with 200 parts of water. Thereupon 22 parts of sodium sulphate dissolved in 60 parts of water and 34 parts of barium chloride dissolved in 80 parts of water are added. At a temperature of 70° C. 150 parts of di-($\beta$-chloroethyl)-acetaldehyde acetal are run in the course of 7 hours, which temperature is maintained for 30 hours.

After thorough washing of the excess of the polysulphide solution, the suspension is dried.

220 parts of a yellowish-green plastic and elastic nearly odorless condensation product are thus obtained.

Example 14

200 parts of the di-(chloroethyl)-acetone mercaptol, of the formula $(CH_3)_2.C.(SC_2H_4Cl)_2$, are added to a solution of 261 parts of sodium tetrasulphide in 500 parts of water while stirring at a temperature of 60° C. After a short time a viscous insoluble condensation product precipitates, which may be separated and purified as described above.

Example 15

150 parts of 1.3-dichloroacetone-diethylmercaptol are reacted upon with 150 parts of sodium trisulphide dissolved in 300 parts of water at a temperature of 80° C., until a plastic elastic condensation product separates.

We claim:

1. The products which are substantially identical with those obtained by causing water soluble sulphides to react upon diethers selected from the group consisting of acetals, mercaptals and mercaptols which contain at least 2 halogen atoms, these products being high-molecular sulphur-containing compounds.

2. The products which are substantially identical with those obtained by causing water soluble polysulphides to react upon diethers selected from the group consisting of acetals, mercaptals and mercaptols which contain at least 2 halogen atoms, these products being high-molecular sulphur-containing compounds.

3. The products which are substantially identical with those obtained by causing water soluble polysulphides to react upon acetals containing at least two chlorine atoms, these products being high-molecular sulphur-containing compounds.

4. The products which are substantially identical with those obtained by causing water soluble polysulphides to react upon mercaptals containing at least two chlorine atoms, these products being high-molecular sulphur-containing compounds.

5. The products which are substantially identical with those obtained by causing water soluble polysulphides to react upon mercaptols containing at least two chlorine atoms, these products being high-molecular sulphur-containing compounds.

6. The products which are substantially identical with those obtained by causing water soluble polysulphides to react upon acetals of formaldehyde containing at least two chlorine atoms, these products being high-molecular sulphur-containing compounds.

7. The products which are substantially identical with those obtained by causing water soluble polysulphides to react upon mercaptals of formaldehyde containing at least two chlorine atoms, these products being high-molecular sulphur-containing compounds.

8. The products which are substantially identical with those obtained by causing water soluble polysulphides to react upon beta-halogen-ethyl-alcohol acetals, these products being high-molecular sulphur-containing compounds.

9. The products which are substantially identical with those obtained by causing water soluble polysulphides to react upon beta-halogen-ethyl-mercaptane mercaptals, these products being high-molecular sulphur-containing compounds.

10. The products which are substantially identical with those obtained by causing water soluble polysulphides to react upon beta-halogen-ethyl-mercaptane mercaptols, these products being high-molecular sulphur-containing compounds.

11. The products which are substantially identical with those obtained by causing water soluble polysulphides to react upon beta-halogen-ethyl-alcohol acetal of formaldehyde, these products being high-molecular sulphur-containing compounds.

12. The products which are substantially identical with those obtained by causing water soluble polysulphides to react upon beta-halogen-ethylmercaptane mercaptal of formaldehyde, these products being high-molecular sulphur-containing compounds.

13. The products which are substantially identical with those obtained by causing water soluble polysulphides to react upon di-(beta-chloro-ethyl)-formaldehyde acetal.

RUDOLF SCHRÖTER.
WILHELM BECKER.